United States Patent
Koke

(10) Patent No.: US 10,660,478 B2
(45) Date of Patent: May 26, 2020

(54) REMOVABLE HANDLE FOR COOKING UTENSIL

(71) Applicant: Gregory Darren Koke, Bohemia, NY (US)

(72) Inventor: Gregory Darren Koke, Bohemia, NY (US)

( * ) Notice: Subject to any disclaimer, the term of this patent is extended or adjusted under 35 U.S.C. 154(b) by 197 days.

(21) Appl. No.: 15/861,290

(22) Filed: Jan. 3, 2018

(65) Prior Publication Data

US 2018/0184851 A1 Jul. 5, 2018

Related U.S. Application Data

(60) Provisional application No. 62/441,702, filed on Jan. 3, 2017, provisional application No. 62/521,503, filed on Jun. 18, 2017.

(51) Int. Cl.
*A47J 45/07* (2006.01)

(52) U.S. Cl.
CPC ............. *A47J 45/071* (2013.01); *A47J 45/07* (2013.01)

(58) Field of Classification Search
CPC ........ A47J 45/07; A47J 45/061; A47J 45/062; A47J 45/071; A47J 45/08; A47J 45/10; A01B 1/026; A45C 2013/223; A47G 19/08
USPC ................ 16/110.1, 422, 425, 426
See application file for complete search history.

(56) References Cited

U.S. PATENT DOCUMENTS

| | | | | |
|---|---|---|---|---|
| 370,395 | A * | 9/1887 | Hurford | B25G 1/04 16/110.1 |
| 402,292 | A * | 4/1889 | Angevine | A47L 13/52 15/257.7 |
| 602,324 | A * | 4/1898 | Hautsch | A47J 45/071 220/759 |
| 749,753 | A * | 1/1904 | Soisson | A47J 45/071 220/759 |
| 901,400 | A * | 10/1908 | Vincent | A47J 45/071 220/752 |
| 3,409,935 | A * | 11/1968 | Wishnick | A47J 45/10 294/27.1 |
| 6,393,973 | B1 * | 5/2002 | Velo | A47J 45/071 16/111.1 |
| D658,433 | S * | 5/2012 | Zemel | D7/393 |
| D682,018 | S * | 5/2013 | Zemel | D7/393 |
| 2007/0266526 | A1 * | 11/2007 | Buckingham | A47J 45/10 16/425 |
| 2008/0110910 | A1 * | 5/2008 | Kleppin | A47J 45/071 220/759 |

* cited by examiner

*Primary Examiner* — Roberta S Delisle

(74) *Attorney, Agent, or Firm* — The Farrell Law Firm, P.C.

(57) ABSTRACT

A removable handle for a cooking utensil is provided. The removable handle includes a proximal end including a gripping surface, a distal end including a plurality of tines, and an elongated shaft extending from the proximal end to the distal end and being bent so that the distal end including the plurality of tines are oriented at an angle that is greater than 45°.

14 Claims, 4 Drawing Sheets

REMOVABLE HANDLE FOR COOKING UTENSIL

PRIORITY

This application claims priority under 35 U.S.C. § 119(e) to U.S. Provisional Application Ser. No. 62/441,702, which was filed on Jan. 3, 2017, and U.S. Provisional Application Ser. No. 62/521,503, which was filed on Jun. 18, 2017, the entire contents of each of these applications is incorporated herein by reference.

BACKGROUND

1. Field of the Disclosure

The present disclosure relates to a handle, and more particularly, to a removable handle for a cooking utensil.

2. Description of the Related Art

Removable handles that are configured to attach to one or more types of cooking utensils, e.g., a frying pan or a pan that is configured for oven, broiler, or barbeque grill use, are known. Such handles, typically, include a proximal end having a gripping surface, a distal end having one or more protrusions or surfaces for attaching to the cooking utensil, and an elongated shaft that extends from the proximal end to the distal end to facilitate attaching the distal end of the removable handle to a cooking utensil. However, in certain instances, e.g., when the cooking utensil is a pan that needs to be taken from a stove top to an oven with multiple racks, the shaft can sometimes make it difficult for a user to position the pan on one of the racks and then un-attach the handle from the pan.

SUMMARY

The present disclosure has been made to address at least the disadvantages described above and to provide at least the advantages described below. Accordingly, an aspect of the present disclosure provides a removable handle for a cooking utensil.

In accordance with an aspect of the present disclosure, there is provided a removable handle for a cooking utensil. The removable handle includes a proximal end including a gripping surface, a distal end including a plurality of tines, and an elongated shaft extending from the proximal end to the distal end and being bent or curved along its length so that the distal end including the plurality of tines are oriented at an angle that ranges from about 75°-90° relative to the proximal end.

In accordance with another aspect of the present disclosure, there is provided a method for manufacturing a removable handle for a cooking utensil. The method includes forming a proximal end including a gripping surface, forming a distal end including a plurality of tines; and forming an elongated shaft that extends from the proximal end to the distal end and being bent so that the distal end including the plurality of tines are oriented at an angle that is greater than 45° relative to the proximal end.

BRIEF DESCRIPTION OF THE DRAWINGS

The above and other aspects, features, and advantages of certain embodiments of the present disclosure will be more apparent from the following detailed description taken in conjunction with the accompanying drawings, in which:

FIG. 3 is a perspective view of a pan that the removable handle is configured to attach to;

DETAILED DESCRIPTION

Various embodiments of the present disclosure will now be described in detail with reference to the accompanying drawings. In the following description, specific details such as detailed configuration and components are merely provided to assist in the overall understanding of these embodiments of the present disclosure. Therefore, it should be apparent to those skilled in the art that various changes and modifications of the embodiments described herein can be made without departing from the spirit and scope of the present disclosure. In addition, descriptions of well-known functions and constructions are omitted for clarity and conciseness.

Figure 1:
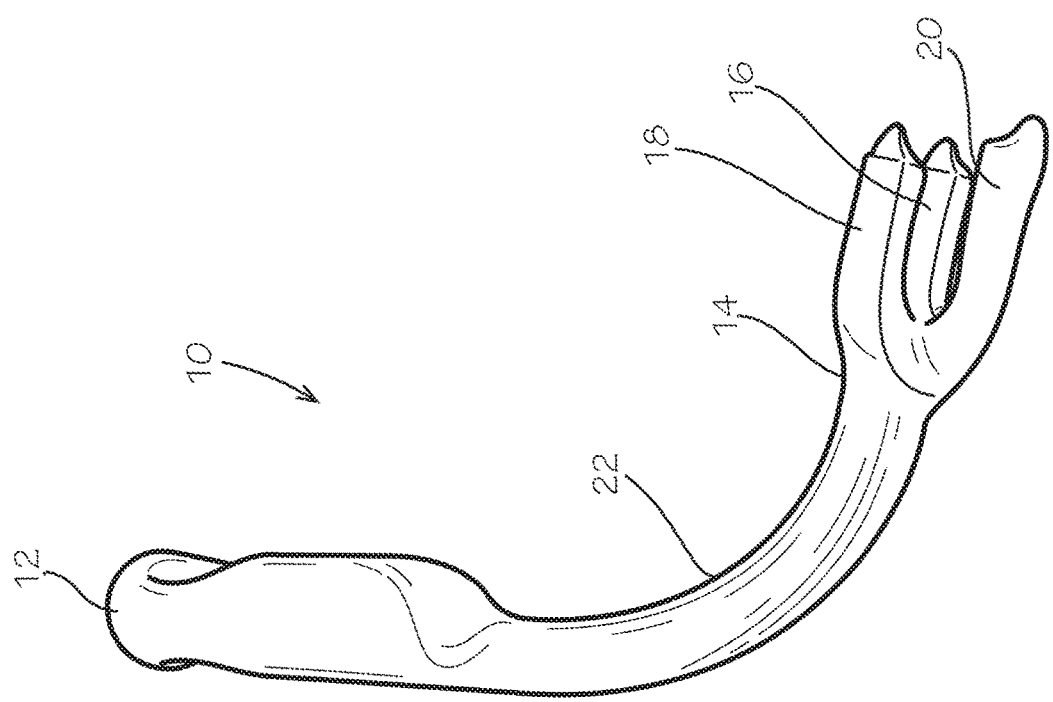
FIG. 1 is a perspective view of a removable handle configured for use with a cooking utensil, in accordance with an embodiment of the present disclosure.

FIG. 1 is a perspective view of a removable handle 10 configured for use with a cooking utensil, in accordance with an embodiment of the present disclosure.

The removable handle 10 can be made from any suitable material including, but not limited to, metal, ceramic, rubber, or plastic, or combination thereof. The removable handle 10 includes a proximal end 12 that can be used as a hand grip or gripping surface, and can be knurled and/or include one or more indents or detents to facilitate gripping thereof. The proximal end 12 can also be covered with or configured to attach to a plastic or other suitable cover. One or more apertures can be provided at the proximal end 12 and can be used for storing the removable handle 10 when it is not being used. For example, the one or more apertures can be configured to receive a hook from a pot rack, or to provide some utility, such as being used as a bottle opener.

A distal end 14 of the removable handle 10 includes a plurality of tines that are configured to attach to the cooking utensil. Three tines including two outer tines 16, 18 that are disposed on opposite sides of a middle tine 20 are shown in the drawings; however, more or fewer tines can be provided. The outer tines 16, 18 have lengths that that may be generally equal to each other, but may have lengths that are greater than a length of the middle tine 20; this facilitates in attaching the removable handle 10 to a cooking utensil. Other than the relative sizes of the outer tines 16, 18 and the middle tine 20, these tines are identical to one another; although, it may prove advantageous to provide outer tines 16, 18 with a configuration that is different from a configuration of the middle tine 20. For example, the outer tines 16, 18 can include tips having a concave configuration (which can serve as claw for gripping a cooking utensil), while a tip of the middle tine 20 can include a convex configuration, which can also serve as a claw. Other tip configurations are envisioned.

Figure 2:
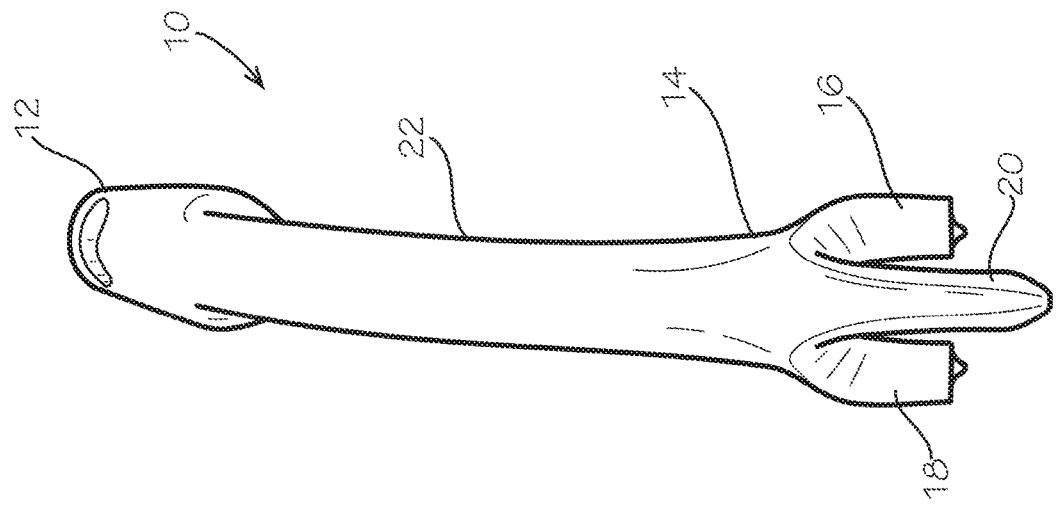
FIG. 2 is a front view of the removable handle.

The outer tines 16, 18 are positioned in a first plane, and are spaced from the middle tine 20 which is positioned in a second plane. The first plane is parallel to and offset from the second plane which enables the tines 16, 18 to fit over the lip or edge of a pan, as described below An elongated shaft 22 extends from the proximal end 12 to the distal end 14 and includes a bent configuration. More particularly, the elongated shaft 22 is bent so that the distal end 14 including the outer tines 16, 18 and the middle tine 20 are oriented at an angle that is greater than 45°, and ranges from about 75°-90° relative to the proximal end 12 (see FIG. 2, for example). The elongated shaft 22 can be bent at other suitable angles, but it has been shown through experimentation that the removable handle 10 works particularly well when it is bent at an angle that ranges from about 85°-90° relative to the proximal end 12.

The elongated handle 10 can be manufactured via any suitable manufacturing process. For example, the removable handle 10 can be monolithically formed via a forging (hot or cold) process or casting process. When the handle 10 is constructed of plastic, it can be molded in a conventional manner. Alternatively, the proximal end 12, the elongated shaft 22, and the distal end 14 can be formed separately (e.g., via the forging or casting processes), and subsequently assembled by connecting these components to each other.

Figure 3:
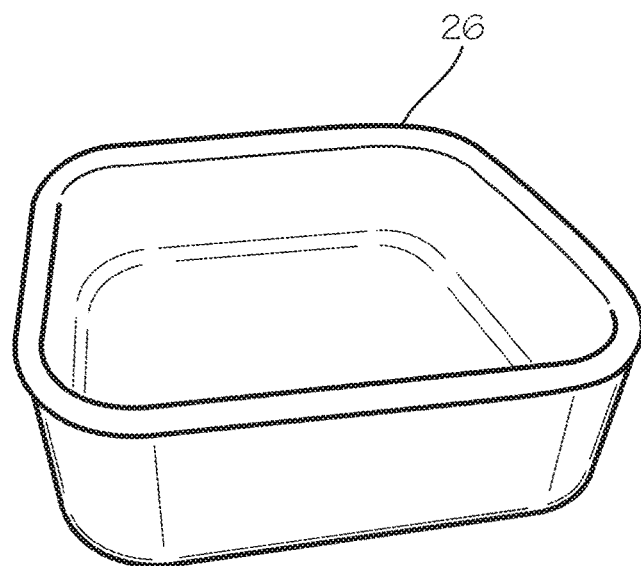
Figure 4:
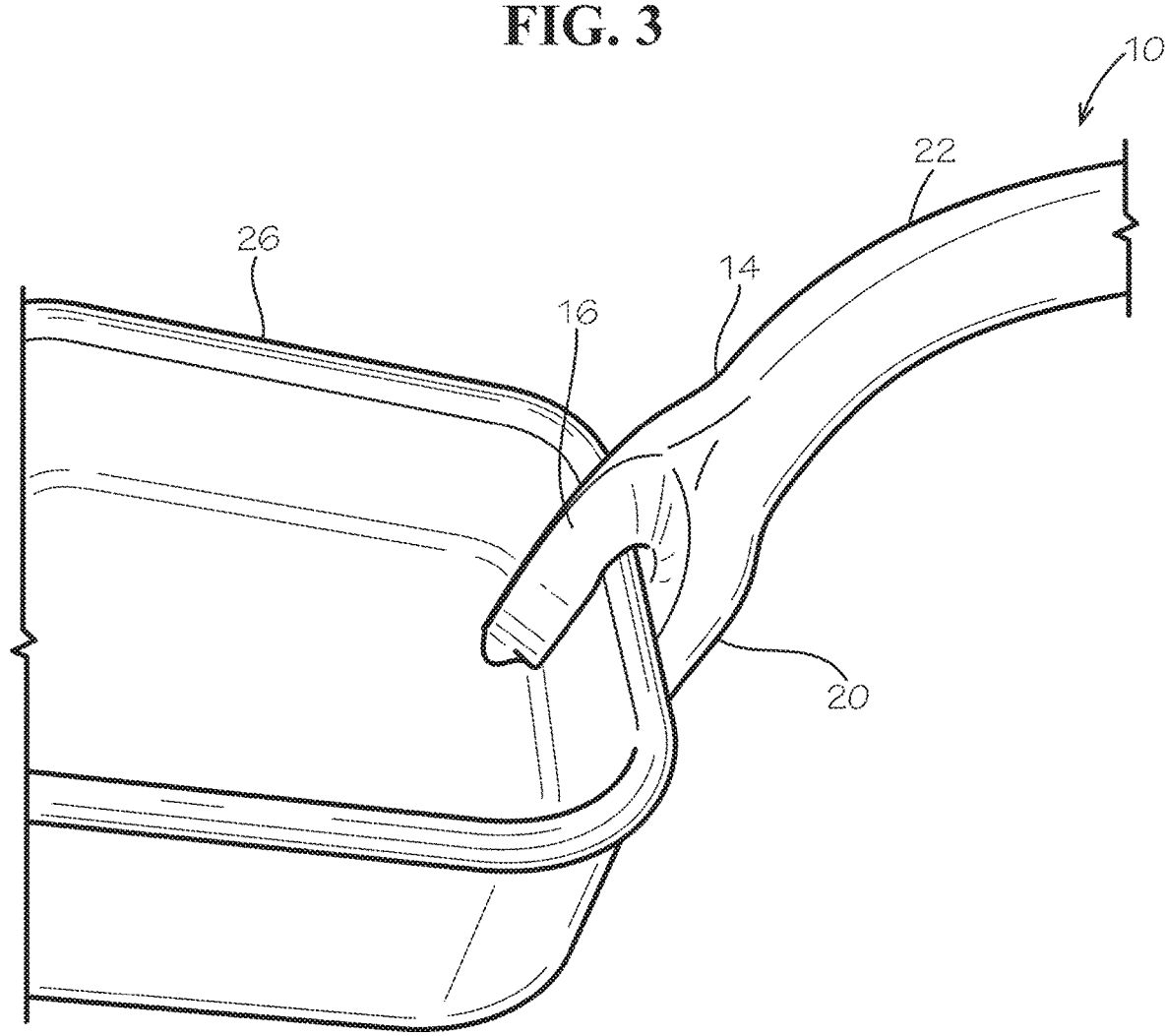
FIG. 4 is a perspective view of the removable handle attached to the pan.

In use, the outer tines 16, 18 and middle tine 20 of the distal end 14 can be attached to one or more cooking utensils, e.g., a pan 26 as shown in FIG. 3. The pan 26 can be round, oval, rectangular, square, or any other geometric configuration. While pan 26 is shown having a lip that extends along a perimeter of an upper edge thereof, such a configuration is not required for the removable handle 10 to operate as described herein.

When a user wants to attach the removable handle 10 to the pan 26, e.g., to move the pan 26 from a stove top to an oven, or remove a pan from a broiler or a barbeque, the user can simply position the lip of the pan 26 between the outer tines 16, 18 and the middle tine 20. With the lip of the pan 26 positioned between the outer tines 16, 18 and the middle tine 20, the weight of the pan 26 and the bend of the elongated shaft 22 keeps the lip of the pan 26 pressed against the outer tines 16, 18 and the middle tine 20, and the user can lift the pan 26.

Various methods can be used to manufacture the removable handle 10. For example, in accordance with the present disclosure, the removable handle can be manufactured via a method that includes forming a proximal end including a gripping surface, forming a distal end including a plurality of tines, and forming an elongated shaft that extends from the proximal end to the distal end and that is bent so that the distal end including the plurality of tines are oriented at an angle of greater than 45°, or at an angle that ranges from about 75°-90° relative to the proximal end. As noted above, the proximal end 12, elongated shaft 22, and distal end 14 can be formed as one unit.

Figure 6:
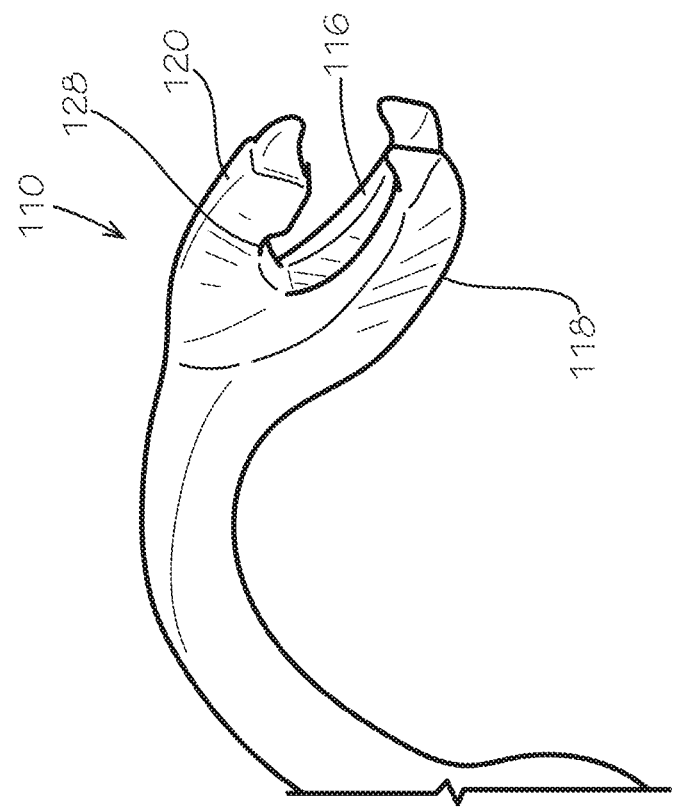
FIG. 6 is a partial, perspective view of the removable handle of FIG. 5.
Figure 5:
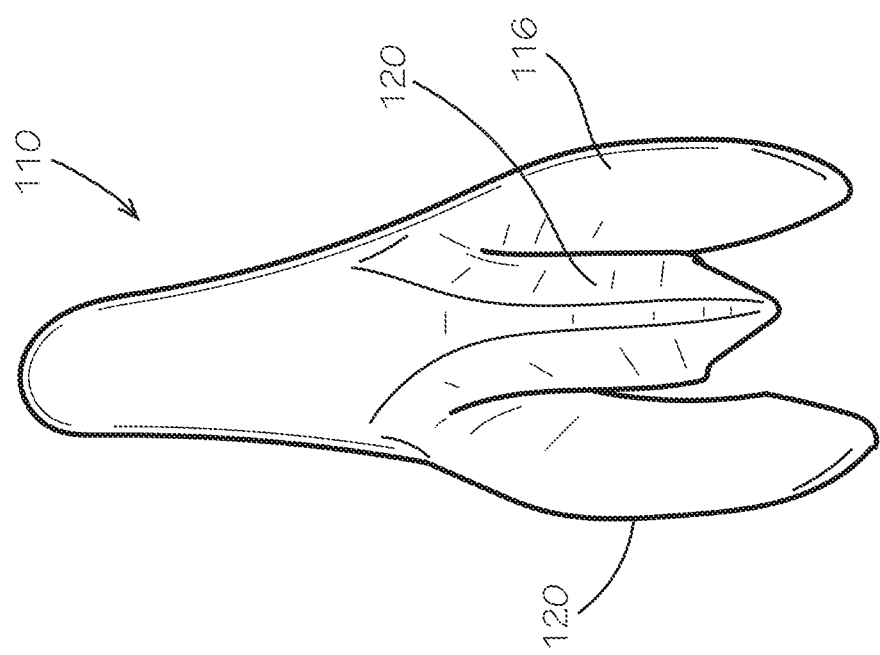
FIG. 5 is a front view of a removable handle, in accordance with an embodiment of the present disclosure.

Moreover, FIGS. 5 and 6 illustrate a removable handle 110, in accordance with an embodiment of the present disclosure. The removable handle 110 is similar to the removable handle 10, and only those features that are unique to the removable handle 110 are described herein. The removable handle 110 can be bent at the angles described above with respect to the removable handle 10, but is bent in a direction opposite of the removable handle 10. The removable handle 110 includes outer tines 116, 118 that are disposed on opposite sides of a middle tine 120, which is shorter than the outer tines 116, 118. The outer tines 116, 118 and middle tine 120 include a generally arcuate configuration to facilitate maintaining the lip of the pan 26 in a pressed configuration against the outer tines 116, 118 and the middle tine 120. Additionally, an arcuate notch 128 is disposed at a proximal end of the middle tine 120. The arcuate notch 128 is configured to engage (or receive) the lip of the pan 26 when the lip is positioned between the outer tines 116, 118 and the middle tine 120; this also facilitates maintaining the lip of the pan 26 in a pressed configuration against the outer tines 116, 118 and the middle tine 120. The outer tines 116, 118 can also include an arcuate notch 128.

Figure 7:
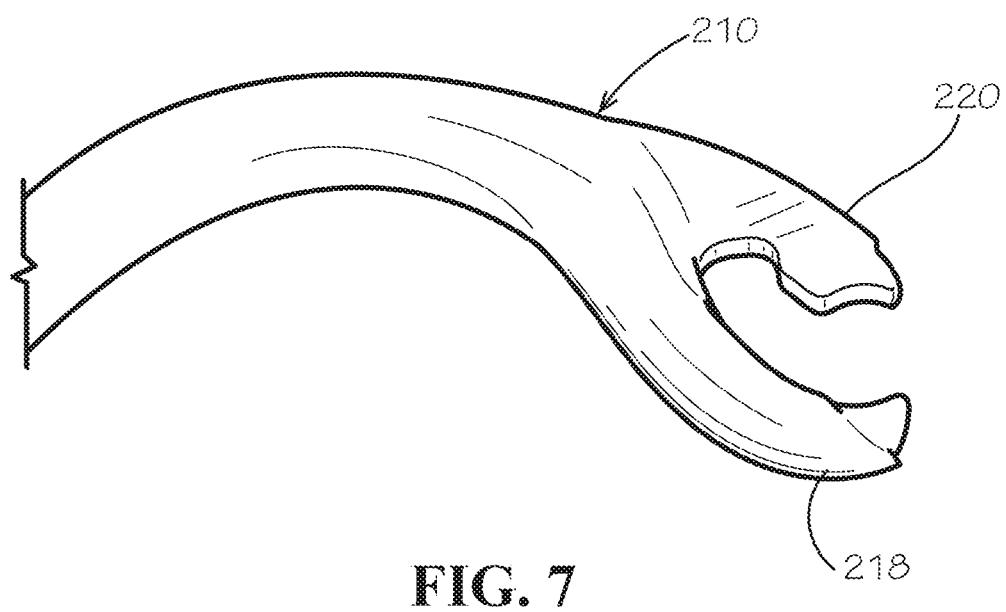
FIG. 7 is a partial, side view of a removable handle, in accordance with an embodiment of the present disclosure.

Furthermore, FIG. 7 illustrates a removable handle 210, in accordance with an embodiment of the present disclosure. The removable handle 210 is similar to the removable handle 110, and only those features that are unique to the removable handle 210 are described herein.

The removable handle 210 includes two outer tines (only outer tine 218 is shown in FIG. 7) and a middle tine 220, which is thinner than the outer tines; however, the outer tines can be as thin as the middle tine 220.

The removable handles 110, 210 can be used in a manner similar to that of the removable handle 10.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. A removable handle for a cooking utensil, the removable handle comprising:
   a proximal end including a gripping surface;
   a distal end including a plurality of tines including at least two outer tines and a middle tine, wherein the middle tine is positioned in a plane that is offset from a plane in which the at least two outer tines are positioned; and
   an elongated shaft extending from the proximal end to the distal end and being bent so that the distal end including the plurality of tines are oriented at an angle that is greater than 45° relative to the proximal end.

2. The removable handle of claim 1, wherein the angle is in a range from 75°-90° relative to the proximal end.

3. The removable handle of claim 1, wherein the at least two outer tines are disposed on opposite sides of the middle tine.

4. The removable handle of claim 3, wherein the middle tine is one of longer than or shorter than the at least two outer tines.

5. The removable handle of claim 3, wherein the middle tine includes a tip having a convex configuration and the at least two outer tines include tips having a concave configuration.

6. The removable handle of claim 3, wherein the plane in which the middle tine is positioned is parallel to the plane in which the outer tines are positioned.

7. The removable handle of claim 1, wherein the removable handle is made from a material selected from the group consisting of metal, ceramic, and plastic.

8. A method for manufacturing a removable handle for a cooking utensil, the method comprising:
   forming a proximal end including a gripping surface;
   forming a distal end including a plurality of tines including at least two outer tines and a middle tine, wherein the middle tine is positioned in a plane that is offset from a plane in which the at least two outer tines are positioned; and forming an elongated shaft that extends from the proximal end to the distal end and being bent so that the distal end including the plurality of tines are oriented at an angle that is greater than 45° relative to the proximal end.

9. The method of claim 8, wherein the angle is in a range of 75°-90° relative to the proximal end.

10. The method of claim 8, wherein forming the distal end includes forming the at least two outer tines to be disposed on opposite sides of the middle tine.

11. The method of claim 10, wherein forming the distal end includes forming the middle tine to be one of longer than or shorter than the at least two outer tines.

12. The method of claim 10, wherein forming the distal end includes forming the middle tine with a tip having a convex configuration and forming the at least two outer tines with tips having a concave configuration.

13. The method of claim 10, wherein the plane in which the middle tine is positioned is parallel to the plane in which the outer tines are positioned.

14. The method of claim 8, further comprising manufacturing the removable handle from a material selected from the group consisting of metal, ceramic, and plastic.

* * * * *